United States Patent
Ji et al.

(10) Patent No.: US 12,229,281 B2
(45) Date of Patent: Feb. 18, 2025

(54) DISPLAY METHOD, APPARATUS, AND STORAGE MEDIUM

(71) Applicant: HUAWEI TECHNOLOGIES CO., LTD., Guangdong (CN)

(72) Inventors: Jie Ji, Hangzhou (CN); Bo Lu, Hangzhou (CN); Senyu Liu, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 848 days.

(21) Appl. No.: 17/116,974

(22) Filed: Dec. 9, 2020

(65) Prior Publication Data

US 2021/0133334 A1 May 6, 2021

Related U.S. Application Data

(63) Continuation of application No. PCT/CN2019/083953, filed on Apr. 23, 2019.

(30) Foreign Application Priority Data

Jul. 19, 2018 (CN) .......................... 201810797126.4

(51) Int. Cl.
*G06F 21/60* (2013.01)
*G06F 21/10* (2013.01)
(Continued)

(52) U.S. Cl.
CPC ............ *G06F 21/602* (2013.01); *G06F 21/10* (2013.01); *G09G 5/37* (2013.01); *H04L 9/0877* (2013.01);
(Continued)

(58) Field of Classification Search
CPC ........ G06F 21/602; G06F 21/10; G06F 21/53; G06F 21/84; G06F 21/566;
(Continued)

(56) References Cited

U.S. PATENT DOCUMENTS 9,910,655 B1 3/2018 Ranganathan et al.
2009/0245521 A1* 10/2009 Vembu .................... G06F 21/10
380/279
(Continued)

FOREIGN PATENT DOCUMENTS

CN 102891795 A 1/2013
CN 106557690 A 4/2017
(Continued)

*Primary Examiner* — Sangseok Park
(74) *Attorney, Agent, or Firm* — WOMBLE BOND DICKINSON (US) LLP

(57) ABSTRACT

A display method, an apparatus, and a storage medium are provided. The method includes: rendering, by a first container, a to-be-displayed page to generate to-be-displayed image data, and encrypting the image data; and writing, by the first container, encrypted image data into a buffer corresponding to the first container, and sending instruction information to a second container of a terminal, where the instruction information is used to instruct the second container to securely display the encrypted image data. Because the containers are isolated from each other, the malware in the first container cannot access the image data displayed in the second container, and the second container securely displays the encrypted image data. In this way, security of displaying the image data can be improved while ensuring that an image display function is not restricted.

10 Claims, 11 Drawing Sheets

(51) Int. Cl.
*G09G 5/37* (2006.01)
*H04L 9/08* (2006.01)

(52) U.S. Cl.
CPC ..... *G09G 2358/00* (2013.01); *G09G 2360/18* (2013.01)

(58) Field of Classification Search
CPC .. G06F 21/6245; G09G 5/37; G09G 2358/00; G09G 2360/18; H04L 9/0877; H04L 63/04
See application file for complete search history.

(56) References Cited

U.S. PATENT DOCUMENTS

| | | |
|---|---|---|
| 2014/0032733 A1 | 1/2014 | Barton et al. |
| 2017/0185776 A1 | 6/2017 | Robinson et al. |
| 2017/0230181 A1* | 8/2017 | Pogorelik .......... H04N 1/32272 |
| 2018/0139238 A1 | 5/2018 | Schultz et al. |
| 2018/0191494 A1* | 7/2018 | Vembu .................... G06F 21/75 |
| 2019/0042706 A1* | 2/2019 | Dewan .................... G06F 21/10 |

FOREIGN PATENT DOCUMENTS

| | | |
|---|---|---|
| CN | 107273719 A | 10/2017 |
| CN | 107567629 A | 1/2018 |
| CN | 108021823 A | 5/2018 |
| CN | 108205623 A | 6/2018 |
| EP | 2887607 A1 | 6/2015 |
| JP | 2010176370 A | 8/2010 |

\* cited by examiner

DISPLAY METHOD, APPARATUS, AND STORAGE MEDIUM

CROSS-REFERENCE TO RELATED APPLICATIONS

This application is a continuation of International Patent Application No. PCT/CN2019/083953, filed on Apr. 23, 2019, which claims priority to Chinese Patent Application No. 201810797126.4, filed on Jul. 19, 2018. The disclosures of the aforementioned applications are hereby incorporated by reference in their entireties.

TECHNICAL FIELD

The present disclosure relates to the field of security technologies, and in particular, to a display method, an apparatus, and a storage medium.

BACKGROUND

With popularization of intelligent terminals, more and more users use intelligent terminals to handle various transactions. For example, in a mobile payment scenario, a user uses an intelligent terminal to pay for shopping or conduct an online banking service, or uses a third-party application for wealth management or transfer. However, page content displayed on the terminal may be stolen by malware. Once sensitive information such as a user account or a password displayed on the terminal is stolen by a lawbreaker, property security of the user is compromised. Therefore, the user has an increasingly urgent demand for protection of image data displayed on the terminal in terms of security.

To prevent the malware from stealing the sensitive information displayed on the terminal, in a solution provided in the prior art, access permission is set for a to-be-displayed page including the sensitive information, for example, a screen capture function and a screen recording function are disabled for the display page by using an activity manager component in an operating system, so that the malware fails to invoke an application programming interface related to the screen capture function or the screen recording function, thereby achieving security protection. However, once the malware breaks through permission restriction on the operating system, a screen capture action and a screen recording action are very likely to be performed, to directly intercept keyboard or screen input content of the user, or steal the sensitive information from a corresponding framebuffer (frame buffer) device before screen display. Therefore, security of this access permission setting solution is not high.

In another solution, a processor chip is divided into a normal world and a secure world based on a TrustZone technology of an ARM processor. The normal world is also referred to as a rich execution environment (REE), and the secure world is also referred to as a trusted execution environment (TEE). When a page including the sensitive information needs to be displayed on a screen, a common operating system running in the normal world displays non-sensitive information, and a trusted operating system running in the secure world takes over an input function and a display function of the screen, and displays the sensitive information by using security hardware. Although the use of the security hardware is highly secure for protection of the sensitive information, a function of specific security hardware is very simplified. As a result, a dynamic graphics layout cannot be implemented, a graphics support capability is weak, and it is difficult to support display of graphics pages of all applications.

In view of the above, how to improve security of displaying image data while ensuring that an image display function is not restricted still needs to be further studied.

SUMMARY

Embodiments of this application provide a display method, an apparatus, and a storage medium, to improve security of displaying image data while ensuring that an image display function is not restricted.

According to a first aspect, an embodiment of this application provides a display method, and the method is applicable to a first container of a terminal. The method includes: rendering, by the first container, a to-be-displayed page to generate to-be-displayed image data, and encrypting the image data; and writing, by the first container, encrypted image data into a buffer corresponding to the first container, and sending instruction information to a second container of the terminal, where the instruction information is used to instruct the second container to securely display the encrypted image data.

In an embodiment of this application, the first container renders the to-be-displayed page to generate the to-be-displayed image data, and encrypts the image data. Even if malware in the first container obtains the encrypted image data in the buffer corresponding to the first container, the malware cannot decrypt the encrypted image data to obtain decrypted image data, thereby improving security of the image data.

Further, the first container generates the to-be-displayed image data through rendering, and instructs, by using the instruction information, the second container to securely display the encrypted image data, and the second container securely displays the encrypted image data, which is different from the prior art in which a simplified operating system in a TEE is required to re-lay out the to-be-displayed page before display. Therefore, even if a function of the second container is very simplified, the image data can be normally displayed by using the second container. In addition, because the first container and the second container are isolated from each other, the malware in the first container cannot access the second container, and therefore cannot obtain the image data that is securely displayed in the second container. In this way, security of displaying the image data can be improved while ensuring that an image display function is not restricted.

In one embodiment, to further ensure security of the image data, the terminal further includes a TEE management module. Before the first container encrypts the image data, the first container sends a first request message to the TEE management module, and receives a first response message returned by the TEE management module, where the first response message includes an encrypt shader generated by the TEE management module based on the first request message; and the first container encrypts the image data by using the encrypt shader. Because the encrypt shader is generated by the TEE management module, security of a procedure of generating the encrypt shader can be ensured. In addition, the encrypt shader is obtained from the TEE management module before the first container encrypts the image data. Therefore, storage security of the encrypt shader can be ensured, thereby further improving security of the encrypted image data.

In one embodiment, to reduce power consumption and reduce a quantity of times of interaction in the terminal, the rendering, by the first container, a to-be-displayed page to generate to-be-displayed image data, and encrypting the image data includes: when determining that an application in the first container needs to be securely displayed, rendering, by the first container, a to-be-displayed page of the application to generate to-be-displayed image data, and encrypting the image data. When determining that the application in the first container does not need to be securely displayed, the first container renders the to-be-displayed page of the application to generate the to-be-displayed image data, and directly displays the to-be-displayed image data.

In one embodiment, the following determining manners may be provided to help the first container determine that the application in the first container needs to be securely displayed. For example, when the first container receives a secure display request triggered by the application, the secure display request is used to indicate that the application needs to be securely displayed, and it is determined that the application in the first container needs to be securely displayed. Alternatively, if the first container determines that the application is a preset secure application, it is determined that the application in the first container needs to be securely displayed.

According to a second aspect, an embodiment of this application provides a display method, and the method is applicable to a second container of a terminal. The method includes: receiving, by the second container, instruction information sent by a first container, where the instruction information is used to instruct the second container to securely display encrypted image data generated by the first container; and obtaining, by the second container, the encrypted image data based on the instruction information, decrypting the encrypted image data, and securely displaying decrypted image data.

In an embodiment of this application, the second container obtains the encrypted image data based on the instruction information sent by the first container, and securely displays the encrypted image data. It can be learned that image data in the first container is encrypted. Even if malware in the first container obtains the encrypted image data from the first container, the malware cannot decrypt the encrypted image data. In addition, because the first container and the second container are isolated from each other, the malware in the first container cannot access the second container, and therefore cannot obtain the image data that is securely displayed in the second container. Therefore, security of the image data can be ensured.

Further, the second container securely displays the encrypted image data, which is different from the prior art in which a simplified operating system in a TEE is required to re-lay out the image data before display. Therefore, even if a function of the second container is very simplified, the image data can be normally displayed by using the second container. In this way, security of displaying the image data can be improved while ensuring that an image display function is not restricted.

In one embodiment, to further ensure security of the image data, the terminal further includes a TEE management module. Before the second container decrypts the encrypted image data, the second container sends a second request message to the TEE management module, and receives a second response message returned by the TEE management module, where the second response message includes a decrypt shader generated by the TEE management module based on a first request message sent by the first container; and the second container decrypts the encrypted image data by using the decrypt shader.

Because the decrypt shader is generated by the TEE management module, security of a procedure of generating the decrypt shader can be ensured. In addition, the decrypt shader is generated based on the first request message sent by the first container, and the second container obtains the decrypt shader from the TEE management module before decrypting the encrypted image data. Therefore, storage security of the decrypt shader can be ensured, thereby further improving security of the image data.

In one embodiment, to help the second container obtain the encrypted image data based on the instruction information, the first container may add the encrypted image data to the instruction information, so that the second container can obtain the encrypted image data from the instruction information; or the first container may add a specific manner of reading the encrypted image data stored in a buffer to the instruction information, so that the second container can read, based on the instruction information, the encrypted image data from the buffer corresponding to the first container.

According to a third aspect, an embodiment of this application provides an apparatus, and the apparatus includes a first container. The first container is configured to implement a function of the method in any one of the first aspect and the possible designs of the first aspect. The function may be implemented by hardware, or may be implemented by executing corresponding software by hardware. The hardware or the software includes one or more modules or units corresponding to the function.

According to a fourth aspect, an embodiment of this application provides an apparatus, and the apparatus includes a second container. The second container is configured to implement a function of the method in any one of the second aspect and the possible designs of the second aspect. The function may be implemented by hardware, or may be implemented by executing corresponding software by hardware. The hardware or the software includes one or more modules or units corresponding to the function.

According to a fifth aspect, an embodiment of this application provides an apparatus, including:
at least one processor; and
a memory communicatively connected to the at least one processor, where the memory stores an instruction that can be executed by the at least one processor, and the instruction is executed by the at least one processor, to enable the at least one processor to perform the method in any one of the possible designs in the first aspect and the second aspect.

According to a sixth aspect, an embodiment of this application further provides a computer readable storage medium. The computer readable storage medium stores a computer instruction, and when the computer instruction is executed by one or more processors, the method in any one of the possible designs in the first aspect and the second aspect is implemented.

According to a seventh aspect, this application further provides a computer program product including an instruction. When the computer program product runs on a computer, the computer is enabled to perform the method in any one of the possible designs in the first aspect and the second aspect.

DESCRIPTION OF EMBODIMENTS

To make the objectives, technical solutions, and advantages of this application clearer, the following further describes this application in detail with reference to the accompanying drawings. A specific operation method in a method embodiment may also be applied to an apparatus embodiment or a system embodiment. In the description of this application, unless otherwise stated, "multiple" means two or more than two.

Figure 1A:
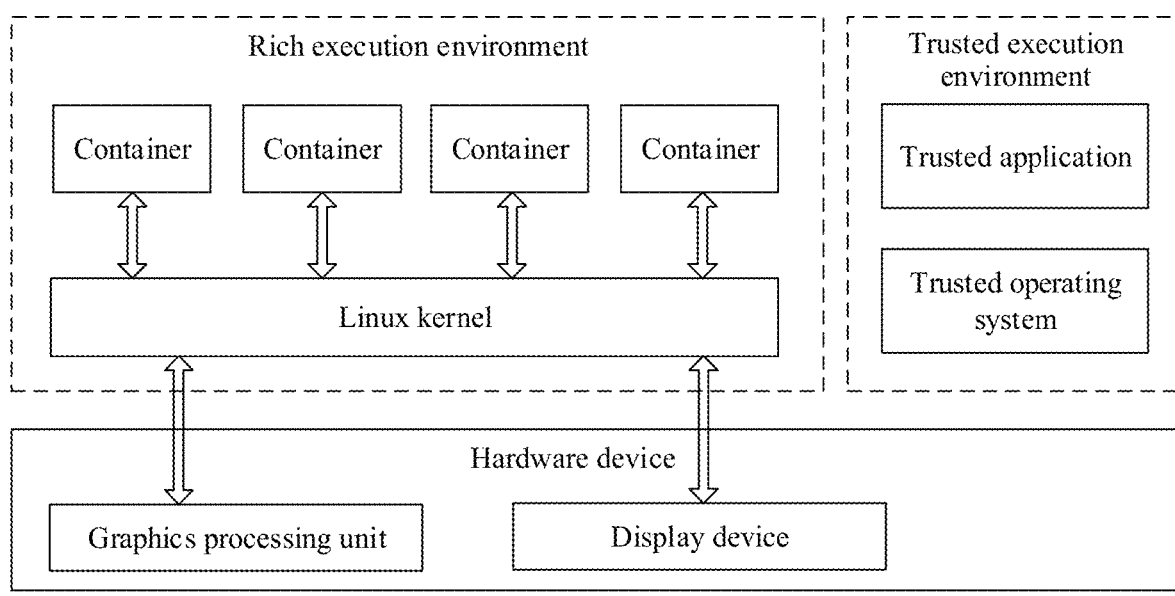
FIG. 1a is a schematic diagram of a system architecture of a terminal according to an embodiment of this application.

FIG. 1a shows an example of a schematic diagram of a system architecture of a terminal according to an embodiment of this application.

As shown in FIG. 1a, the system architecture includes two execution environments: an REE and a TEE. The REE includes a plurality of containers and a Linux kernel, and the TEE includes a trusted application (TA) and a trusted operating system.

In this embodiment of this application, a container may be a virtual machine implemented based on kernel virtualization. Different containers may have different functions. For example, some containers in the plurality of containers may be configured to install an application, some containers may be configured to securely display a page in the application, and some containers may have other possible functions. This is not limited. Further, for ease of description, containers having a same function may be classified into containers of a same type. For example, a container for installing an application may be classified into a first-type container, and a container for securely displaying a page in the application may be classified into a second-type container. During specific implementation, the REE may include one or more first-type containers and one or more second-type containers, and may further include another type of container. The following uses only an example in which the REE includes one first-type container and one second-type container for description.

In the REE, each container may have independent user space, and the user space includes an independent root directory, a file system, a network, independent inter-process communication, an independent process number, and the like. The container may further include an application program running in the user space. Due to a user space isolation mechanism of an operating system, application programs (or applications for short) in any two containers are isolated from each other and do not interfere with each other. The application program may include an application program installed in a terminal by a user of the terminal based on a requirement of the user, for example, Alipay, WeChat, or a bank client application, or may include an application program that is installed in the terminal by default and that is used to implement a basic function, for example, Messaging or Dialer. It can be understood that the foregoing is merely an example for description. An application program in each container may further include another possible client application program. This is not limited.

In an embodiment of this application, the plurality of containers in the REE may include at least two types of containers. One type of container is configured to install an application, for example, a container a in the REE, and the other type of container is configured to securely display a page in the application, for example, a container b in the REE. During specific implementation, the application may be installed in the container a, and image data corresponding to the page that needs to be securely displayed in the application is displayed by using the container b. In this way, because a third-party application that may carry a Trojan program is installed in the container a, and the container a and the container b are isolated from each other, the Trojan program cannot obtain the image data displayed by using the container b, thereby improving security of displaying the image data.

In the TEE, the trusted application runs in the trusted operating system, and the trusted application may provide a security service for the user, for example, generating a security algorithm and an encryption/decryption key. In this embodiment of this application, the trusted application generates an encrypt shader and a decrypt shader in the TEE. The encrypt shader is a program for encrypting image data that needs to be securely displayed, includes an encryption algorithm and an encryption key, and is installed in a graphics rendering pipeline corresponding to a first container. The decrypt shader is a program for decrypting encrypted image data in a second container, includes a decryption algorithm and a decryption key, and is installed in a graphics rendering pipeline corresponding to the second container. The trusted operating system is configured to provide functions of the trusted operating system, such as a security algorithm and secure storage. The security algorithm may provide an encryption/decryption algorithm service and an application programming interface (API) in the TEE, and the secure storage may store sensitive data such as an encryption key and a decryption key in security hardware (referring to FIG. 1b), for example, a secure memory, to enhance security of the sensitive data.

A hardware device may include a graphics processing unit (GPU), and may further include a display device such as a liquid crystal display (LCD).

Figure 1B:
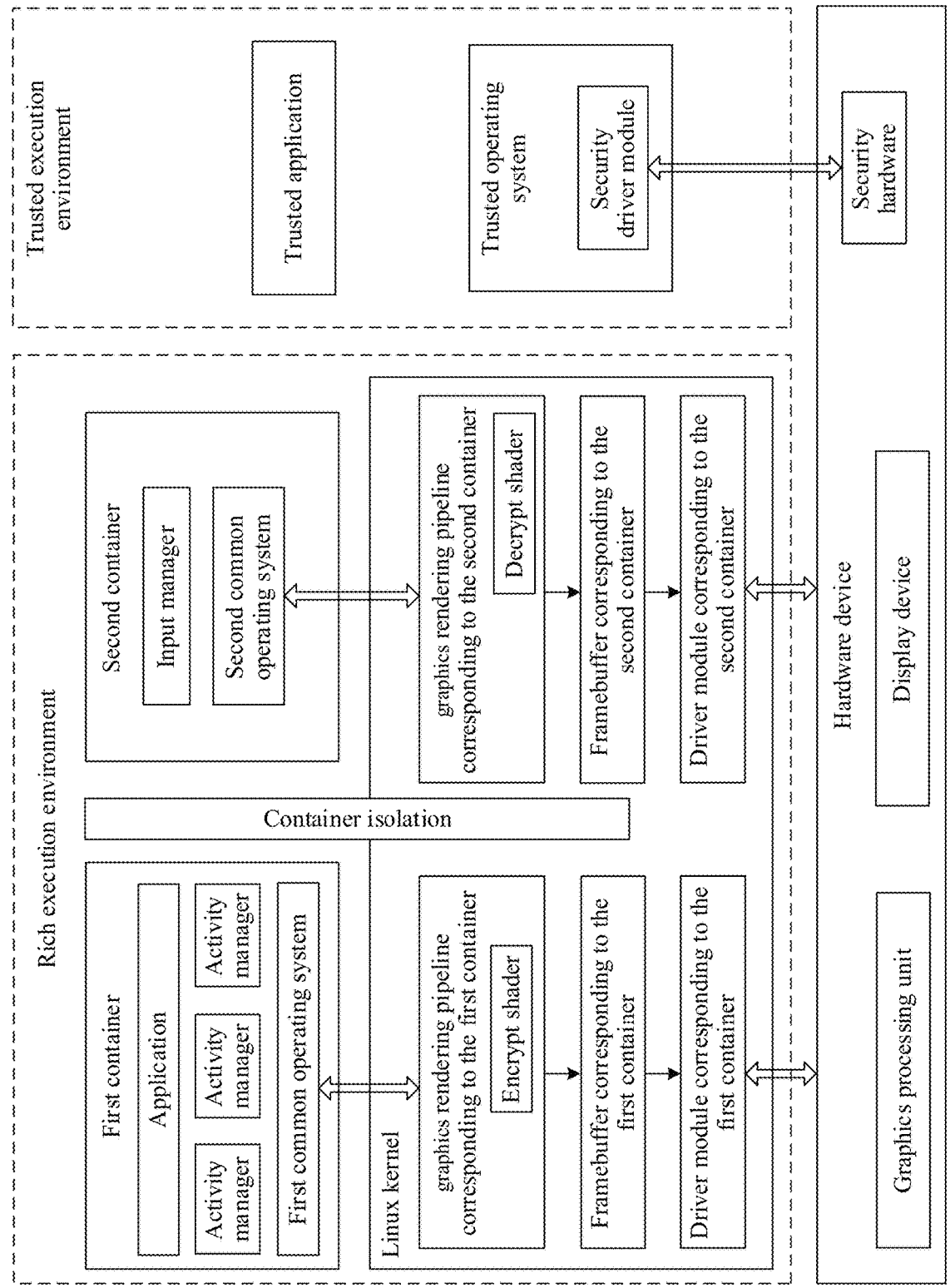
FIG. 1b is another schematic diagram of a system architecture of a terminal according to an embodiment of this application.

Based on FIG. 1a, FIG. 1b shows an example of a schematic diagram of a system architecture of another terminal according to an embodiment of this application.

Referring to FIG. 1b, two containers (a first container and a second container) included in an REE are shown as an example.

Based on the foregoing description, the first container may be a container for installing an application, and the second container may be a container for securely displaying a page in the application. The first container and the second container may be isolated by using an isolation layer.

The first container may be used for running a first common operating system that interacts with a user, for example, an Android operating system or a Wince operating system. In addition to the first common operating system and the application, the first container may include an application framework layer between the application and the operating system. The application framework layer mainly includes an activity manager, a window (windows) manager, an input (input) manager, and the like. The activity manager is configured to manage a life cycle of each application program, provide a common navigation rollback function, and provide an interaction interface for windows of all programs. The window (windows) manager is configured to manage all opened window programs. The input manager is configured to provide an interaction interface for a mouse, a keyboard, a touchscreen, and the like, and provide a function such as input event reporting.

The second container may be configured to provide a secure display and interaction environment. A second operating system runs in the second container. In one embodiment, the second operating system may be an intelligent operating system having a same function as the first operating system. To save memory resources, the second operating system may be a simplified operating system having a very simple function and supporting only a display framework, and an input subsystem and a display subsystem are attached in the simplified operating system. The input subsystem is configured to receive an operation instruction input by the user, for example, an account input instruction, an account login instruction, or a payment instruction. The display subsystem is configured to: provide a display page for the user, and invoke hardware (such as an LCD) to display image data.

Further, the REE further includes a Linux kernel. In one embodiment, each container may correspond to one Linux kernel. To save memory resources, as shown in FIG. 1b, all containers in the REE may share one Linux kernel. A Linux kernel shown in FIG. 1b includes a graphics rendering pipeline, a framebuffer corresponding to the first container, a framebuffer corresponding to the second container, a driver module corresponding to the first container, and a driver module corresponding to the second container.

The graphics rendering pipeline runs in a GPU, and the graphics rendering pipeline performs rendering operations such as vertex rendering and pixel rendering on the image data in a pipeline manner in stages. Most video cards have many processor cores, and a respective applet runs on the GPU for each stage to complete data processing. These applets are referred to as shaders, for example, an encrypt shader and a decrypt shader shown in FIG. 1b. The encrypt shader is configured to encrypt to-be-encrypted image data, and the decrypt shader is configured to decrypt encrypted image data.

A framebuffer is a driver interface provided by a Linux system for a display device. The framebuffer allows an upper-layer application program to directly perform a read/write operation on a display buffer in a graphics mode, and the write operation may be immediately displayed on a screen. In an embedded system, there is generally no dedicated video memory, and only a section of display buffer (a buffer for short) is allocated from random access memory (RAM) space. For example, if the image data is written into the framebuffer corresponding to the first container, the image data is written into a buffer corresponding to the first container; or if the image data is written into the framebuffer corresponding to the second container, the image data is written into a buffer corresponding to the second container.

The driver module corresponding to the first container and the driver module corresponding to the second container are configured to drive a hardware device. For example, when the first container needs to display the image data by using a display device shown in FIG. 1b, the first common operating system sends an instruction to a display device driver corresponding to the first container, and after receiving the corresponding instruction, the display device driver displays the to-be-displayed image data on the display device.

In one embodiment, the first container and the second container may communicate with each other, but a secure channel needs to be established before the communication, for example, communication may be performed through Unix domain socket communication.

A display method provided in the embodiments of this application may implement secure display of image data. The display method is not only applicable to encryption and decryption protection of image data of content such as payment sensitive information, but also applicable to a digital rights management (DRM) scenario, for example, preventing screen recording during video play, and preventing screen recording and screen capturing during remote video communication, to prevent to-be-protected content from being directly intercepted. The display method is also applicable to a scenario in which other to-be-protected information needs to be displayed, and details are not described herein.

Embodiment 1

Figure 2:
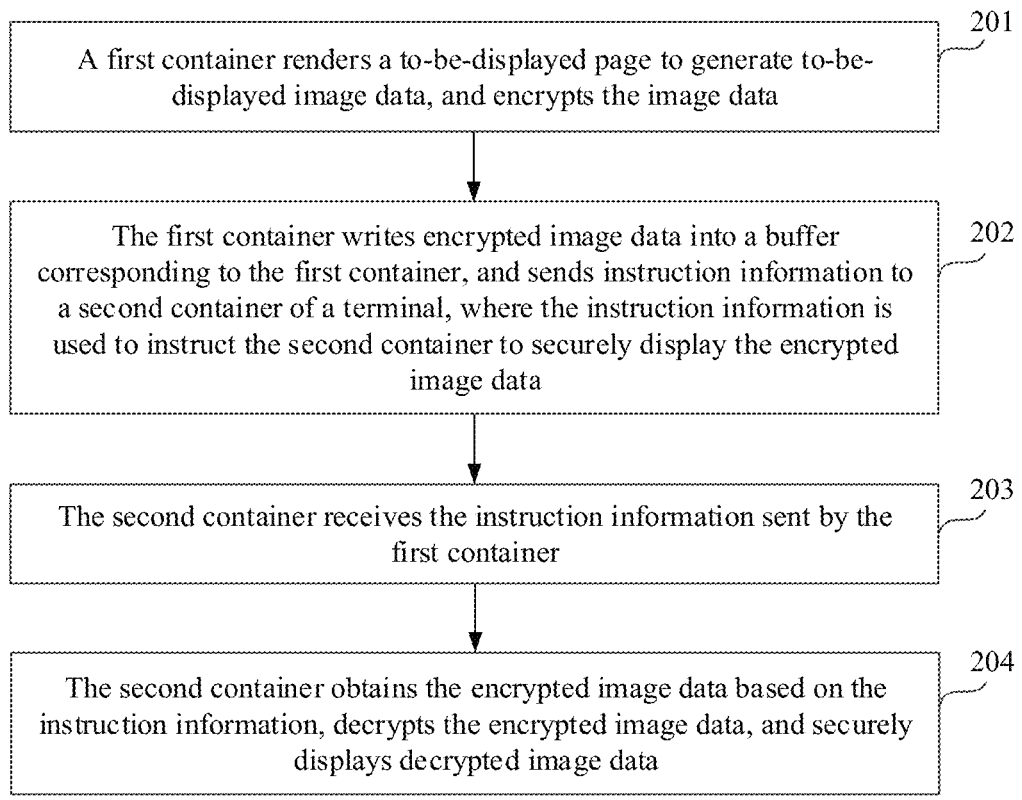
FIG. 2 is a schematic flowchart of a display method according to an embodiment of this application.

FIG. 2 shows an example of a schematic flowchart of a display method according to an embodiment of this application. The method is applicable to a first container of a terminal. As shown in FIG. 2, the method includes the following operations.

Operation 201: The first container renders a to-be-displayed page to generate to-be-displayed image data, and encrypts the image data.

Herein, a plurality of applications may be installed in the first container. Taking one (an application a) of the applications as an example, a plurality of pages may be generated in a running procedure of the application a. In an example, some pages of the application a need to be securely displayed, but some pages do not need to be securely displayed. For example, the application a is WeChat. Because a payment page of WeChat may include sensitive information, the payment page needs to be securely displayed, but a chat page of WeChat may not be securely displayed. In another example, all pages of the application a need to be securely displayed. For example, the application a is a bank client application. Because all pages of the bank client application may include sensitive information, all the pages need to be securely displayed.

To reduce power consumption and reduce a quantity of times of interaction in the terminal, in one embodiment, a specific manner of implementing operation 201 may be: when determining that an application in the first container needs to be securely displayed, the first container renders the to-be-displayed page to generate the to-be-displayed image data, and encrypts the image data. When determining that the application in the first container does not need to be securely displayed, the first container renders the to-be-displayed page of the application to generate the to-be-displayed image data, and directly displays the to-be-displayed image data.

In this embodiment of this application, there may be a plurality of specific implementations in which the first container determines that the application in the first container needs to be securely displayed. In a possible implementation, when the to-be-displayed page needs to be securely displayed, the application actively triggers a secure display request, and the secure display request is used to indicate that the application needs to be securely displayed. In this way, after receiving the secure display request triggered by the application, the first container may determine that the application needs to be securely displayed. This manner may be applicable to an application that supports a secure display page or an application that enables a conventional secure display request identifier, and the conventional secure display request identifier may be a FLAG SECURE parameter.

For example, if the application is an application that supports secure display, when the to-be-displayed page of the application is a secure display page, the application actively triggers the secure display request. The first container receives the secure display request, and sends instruction information to a second container to instruct the second container to securely display the to-be-displayed page. If the to-be-displayed page of the application is not a secure display page, the first container directly displays the to-be-displayed page, to improve display efficiency.

In an embodiment, whether the application supports a secure display page needs to be determined. In addition to a manner in which the application actively requests the first container to set the page of the application as a secure display page, various third-party applications that have been released on the market need to be modified and adapted again to support a secure display page. Therefore, to ensure that the display method in this application is applicable to the various released third-party applications, the first container may determine, in another possible manner, whether the application needs to be securely displayed.

In another embodiment, for example, in a scenario in which the application cannot determine whether the page needs to be securely displayed, the first container actively determines whether the application needs to be securely displayed. If the first container determines that the application is a preset secure application, the first container determines that the application in the first container needs to be securely displayed. The preset secure application may include various payment applications, for example, Alipay and an E-bank client application.

In this manner, the preset secure application is set in a plurality of manners. In one manner, a whitelist is prestored, and the whitelist includes identifiers of one or more preset secure applications. During specific implementation, the first container may identify whether the application is an application included in the whitelist. If the application is an application included in the whitelist, the first container determines that the application is a preset secure application. If the application is not an application included in the whitelist, the first container determines that the application is not a preset secure application. In another manner, the first container determines whether the application is set by a system security attribute as a to-be-protected application. If the application is set as a to-be-protected application, the first container determines that the application is a preset secure application. If the application is not set as a to-be-protected application, the application is not a preset secure application.

After determining that the application is a preset secure application, the first container may set all pages of the application as secure display pages. In this case, when any page in the application needs to be displayed, the first container may determine that the application needs to be securely displayed. In one embodiment, a specific page in the application may be set as a secure display page. In this case, when the specific page needs to be displayed, the first container may determine that the application needs to be securely displayed, and a page other than the specific page may not need to be securely displayed.

In operation 201, the to-be-displayed image data is generated through rendering for one page in the application. For example, the application includes a page A, a page B, and a page C. If only the page B needs to be securely displayed, when the page B needs to be displayed, the page B is rendered to generate to-be-displayed image data, and the image data is encrypted. If the page A or the page C needs to be displayed, the page A or the page C may be directly displayed after being rendered without encryption. If the first container determines that the page A, the page B, and the page C in the application all need to be securely displayed, when the page A needs to be displayed, the page A is rendered to generate to-be-displayed image data. When the page B or the page C needs to be displayed, the page B or the page C is rendered to generate to-be-displayed image data.

With reference to FIG. 1b, the rendering and encryption operations in operation 201 are completed in a graphics rendering pipeline corresponding to the first container in FIG. 1b, and encrypted image data is stored in a display buffer corresponding to the first container. Even if a third-party application in the first container obtains the encrypted image data in the display buffer, the encrypted image data cannot be decrypted. In this way, security of the obtained encrypted image data is higher.

In an embodiment, the image data may be encrypted by using a symmetric key or an asymmetric key, or may be encrypted by using hardware.

In one embodiment, before operation 201, when the application in the first container is started, it is determined whether the application needs to be securely displayed. If the application needs to be securely displayed, operation 201 and operation 202 are performed. If the application does not need to be securely displayed, the first container may directly display the to-be-displayed image data of the application. The to-be-displayed image data may be written into a framebuffer corresponding to the first container shown in FIG. 1b, to write the to-be-displayed image data into a buffer corresponding to the first container, and a display device is driven by using a driver module corresponding to the first container to display the image data.

Operation 202: The first container writes encrypted image data into a buffer corresponding to the first container, and sends instruction information to a second container of the terminal, where the instruction information is used to instruct the second container to securely display the encrypted image data.

There may be a plurality of types of specific content of the instruction information. For example, the instruction information may include address information of the buffer in which the encrypted image data is located, or may include the encrypted image data, or may include indication information indicating that the image data that needs to be securely displayed exists in the first container.

In one embodiment, the method performed by the first container in operation 201 and operation 202 may be performed by a first common operating system in the first container.

In this embodiment of this application, it can be learned from operation 201 and operation 202 that the first container renders the to-be-displayed page to generate the to-be-displayed image data, and encrypts the image data. Even if malware in the first container obtains the encrypted image data in the buffer corresponding to the first container, the malware cannot decrypt the encrypted image data to obtain decrypted image data, thereby improving security of the image data.

Further, the first container generates the to-be-displayed image data through rendering, and instructs, by using the instruction information, the second container to securely display the encrypted image data, and the second container securely displays the encrypted image data, which is different from the prior art in which a simplified operating system in a TEE is required to re-lay out the to-be-displayed page before display. Therefore, even if a function of the second container is very simplified, the image data can be normally displayed by using the second container. In addition, because the first container and the second container are isolated from each other, the malware in the first container cannot access the second container, and therefore cannot obtain the image data that is securely displayed in the second container. In this way, security of displaying the image data can be improved while ensuring that an image display function is not restricted.

In this embodiment of this application, after operation 202, the method further includes operation 203 and operation 204.

Operation 203: The second container receives the instruction information sent by the first container, where the instruction information is used to instruct the second container to securely display the encrypted image data generated by the first container.

Operation 204: The second container obtains the encrypted image data based on the instruction information, decrypts the encrypted image data, and securely displays decrypted image data.

In one embodiment, the method performed by the second container in operation 202 and operation 203 may be performed by a second common operating system in the second container.

In this embodiment of this application, it can be learned from operation 203 and operation 204 that the second container obtains the encrypted image data based on the instruction information sent by the first container, and securely displays the encrypted image data. It can be learned that image data in the first container is encrypted. Even if malware in the first container obtains the encrypted image data from the first container, the malware cannot decrypt the encrypted image data. In addition, because the first container and the second container are isolated from each other, the malware in the first container cannot access the second container, and therefore cannot obtain the image data that is securely displayed in the second container. Therefore, security of the image data can be ensured.

Further, the second container securely displays the encrypted image data, which is different from the prior art in which a simplified operating system in a TEE is required to re-lay out the to-be-displayed page before display. Therefore, even if a function of the second container is very simplified, the image data can be normally displayed by using the second container. In this way, security of displaying the image data can be improved while ensuring that an image display function is not restricted.

In an embodiment, in operation 202, to help the second container obtain the encrypted image data based on the instruction information, the first container may add the encrypted image data to the instruction information, so that the second container obtains the encrypted image data from the instruction information in operation 204; or the first container adds a specific manner of reading the encrypted image data stored in the buffer to the instruction information, so that the second container can read, based on the instruction information in operation 204, the encrypted image data from the buffer corresponding to the first container.

To further ensure security of the image data, in an embodiment, an encryption key is generated in a TEE management module in the terminal. In this way, security of the key can be improved. In one embodiment, the TEE management module may be a trusted application and a trusted operating system in FIG. 1b.

Before the first container encrypts the image data, the first container sends a first request message to the TEE management module, and receives a first response message returned by the TEE management module. The first request message is used to request an encrypt shader from the TEE management module, and the first response message includes the encrypt shader generated by the TEE management module based on the first request message. Then, the first container encrypts the image data using the encrypt shader. Because the encrypt shader is generated by the TEE management module, security of a procedure of generating the encrypt shader can be ensured. In addition, the encrypt shader is obtained from the TEE management module before the first container encrypts the image data. Therefore, storage security of the encrypt shader can be ensured, thereby further improving security of the encrypted image data.

Because an encryption procedure and a decryption procedure are reverse procedures, to ensure that the encrypted image data obtained through encryption by using the encrypt shader can be normally decrypted, when generating the encrypt shader, the TEE management module also generates a decrypt shader corresponding to the encrypt shader. The TEE management module generates the encrypt shader and the decrypt shader based on the first request message. When the second container needs to decrypt the encrypted image data, the second container obtains, from the TEE management module, the decrypt shader corresponding to the encrypt shader. In this way, security of an encryption/decryption key is ensured by using a security feature of TEE hardware, and security of the encrypt shader and the decrypt shader can be ensured.

Correspondingly, before the second container decrypts the encrypted image data, the second container sends a second request message to the TEE management module, and receives a second response message returned by the TEE management module, where the second response message includes the decrypt shader generated by the TEE management module based on the first request message sent by the first container; and the second container decrypts the encrypted image data by using the decrypt shader. Because the decrypt shader is generated by the TEE management module, security of a procedure of generating the decrypt shader can be ensured. In addition, the decrypt shader is generated based on the first request message sent by the first container, and the second container obtains the decrypt shader from the TEE management module before decrypting the encrypted image data. Therefore, storage security of the decrypt shader can be ensured, thereby further improving security of the image data.

Figure 3:
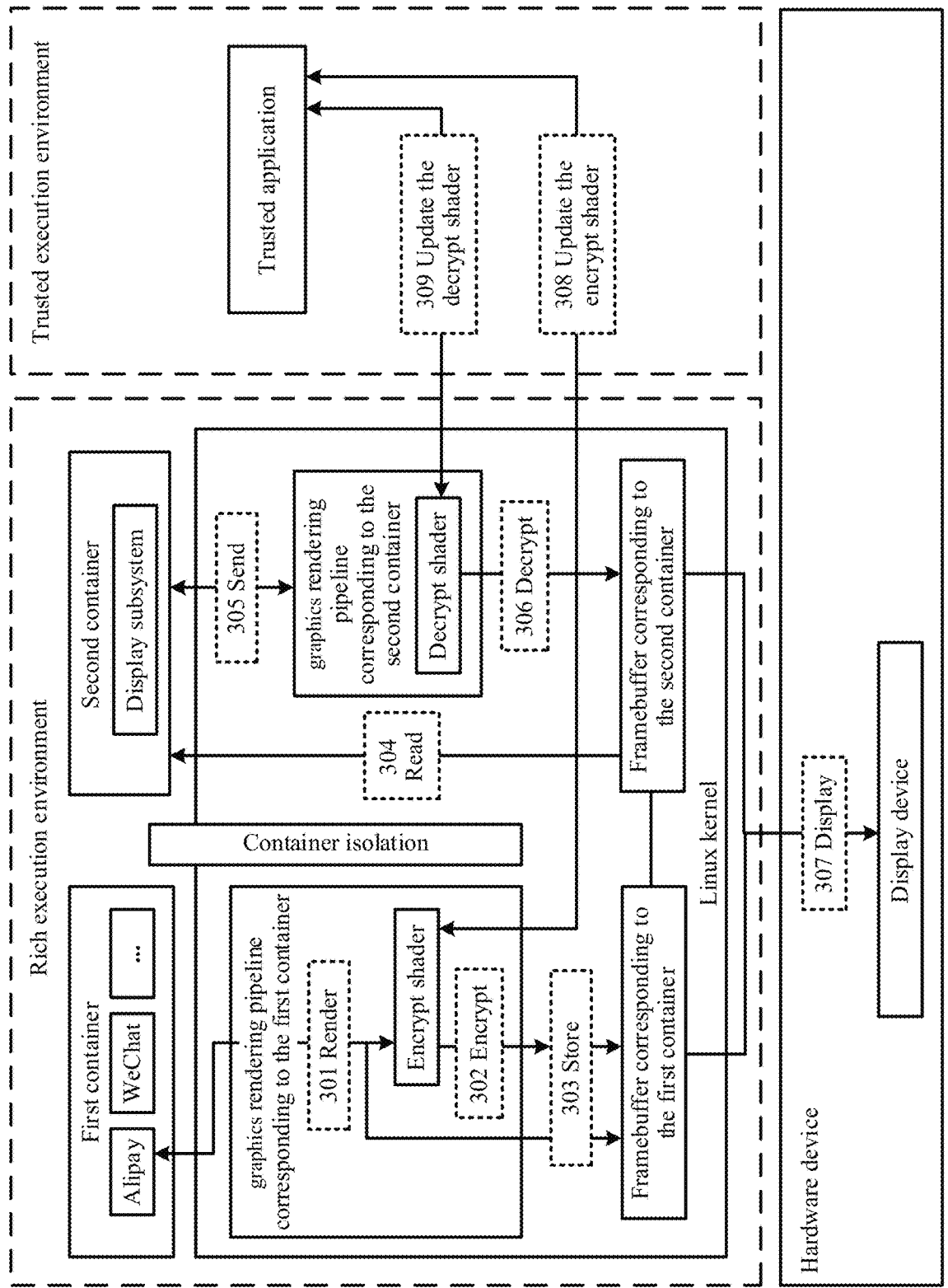
FIG. 3 is another schematic flowchart of a display method according to an embodiment of this application.

The following describes in detail a possible implementation of the foregoing display method with reference to FIG. 3. FIG. 3 shows an example of another schematic flowchart of a display method according to an embodiment of this application. As shown in FIG. 3, for example, a first page in Alipay needs to be displayed. The display method includes the following operations.

Operation 301: Render the first page in Alipay by using a graphics rendering pipeline corresponding to a first container.

After operation 301 is performed, if the first page needs to be securely displayed, operation 302 is performed. If the first page does not need to be securely displayed, operation 303 is directly performed.

Operation 302: Encrypt rendered image data in operation 301 by using an encrypt shader embedded in the graphics rendering pipeline corresponding to the first container, to obtain encrypted image data.

Operation 303: Store the encrypted image data obtained in operation 302 or the rendered and unencrypted image data obtained in operation 301 in a display buffer corresponding to the first container.

After operation 303 is performed, if the encrypted image data is in the display buffer corresponding to the first container, operation 304 is performed. If the rendered and unencrypted image data is in the display buffer corresponding to the first container, operation 307 is performed.

Operation 304: A second container reads the encrypted image data from the display buffer corresponding to the first container.

Operation 305: The second container sends the encrypted image data to a graphics rendering pipeline corresponding to the second container.

Operation 306: Decrypt the encrypted image data by using a decrypt shader embedded in the graphics rendering pipeline corresponding to the second container, to obtain decrypted image data.

Operation 307: Display, by using a display device, the rendered and unencrypted image data in the display buffer corresponding to the first container, or display, by using the display device, the decrypted image data in a display buffer corresponding to the second container.

It should be noted that, to improve security of the encrypted image data, before operation 308, operation 308 may be further included in FIG. 3. Correspondingly, before operation 306, operation 309 is further included.

Operation 308: Update the encrypt shader in the graphics rendering pipeline corresponding to the first container, and embed an updated encrypt shader in the graphics rendering pipeline corresponding to the first container.

Operation 309: Update the decrypt shader in the graphics rendering pipeline corresponding to the second container, and embed an updated decrypt shader in the graphics rendering pipeline corresponding to the second container.

In the example shown in FIG. 3, on one hand, image data that needs to be securely displayed in an application is encrypted in the first container, and is displayed by using the second container, thereby improving security of the image data that needs to be securely displayed. On the other hand, image data that does not need to be securely displayed in the application is directly displayed by using the first container, thereby reducing power consumption.

Figure 4:
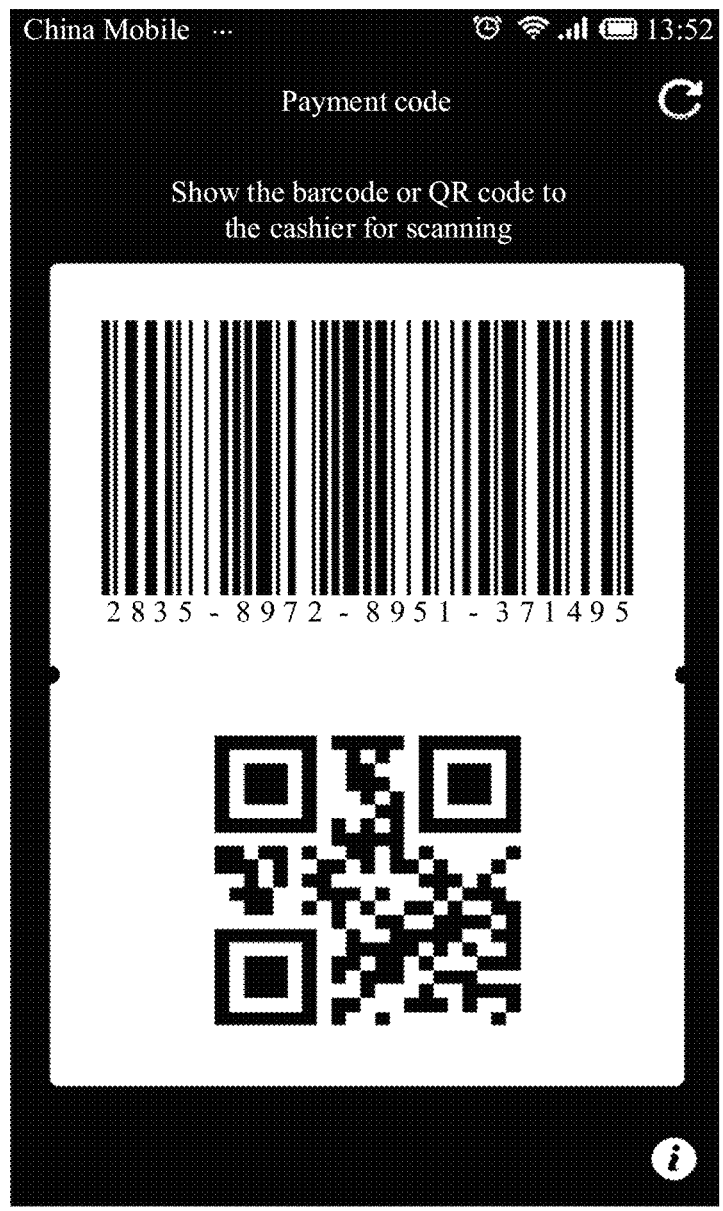
FIG. 4 is a schematic diagram of a two-dimensional code page in a payment scenario according to an embodiment of this application.
Figure 5:
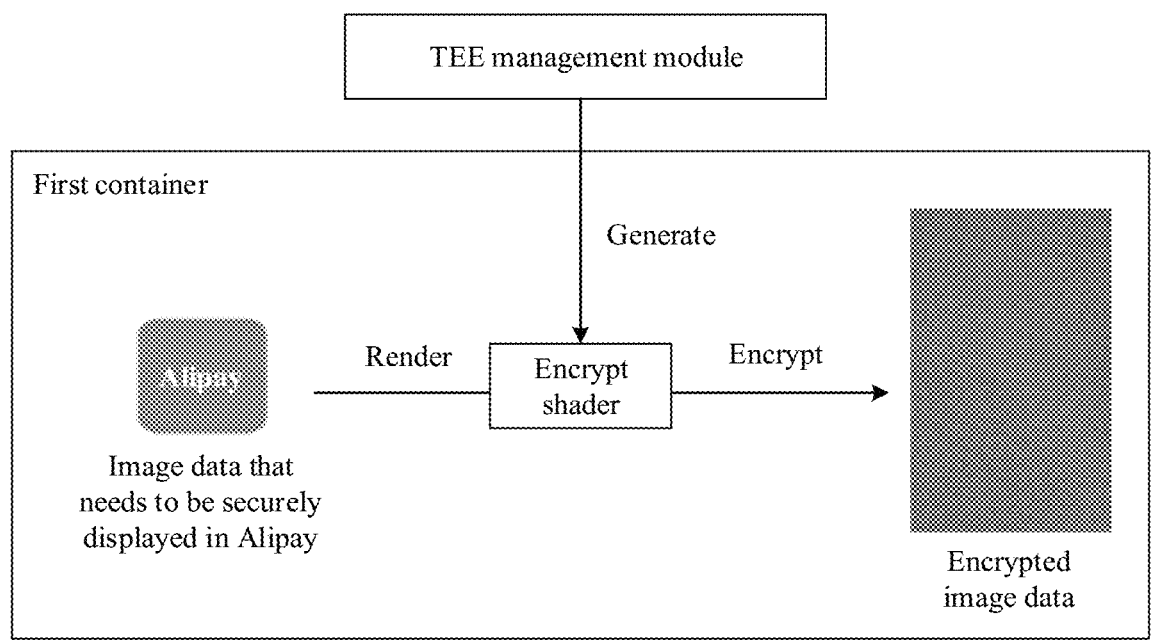
FIG. 5 is a schematic diagram of an encryption procedure according to an embodiment of this application.
Figure 6:
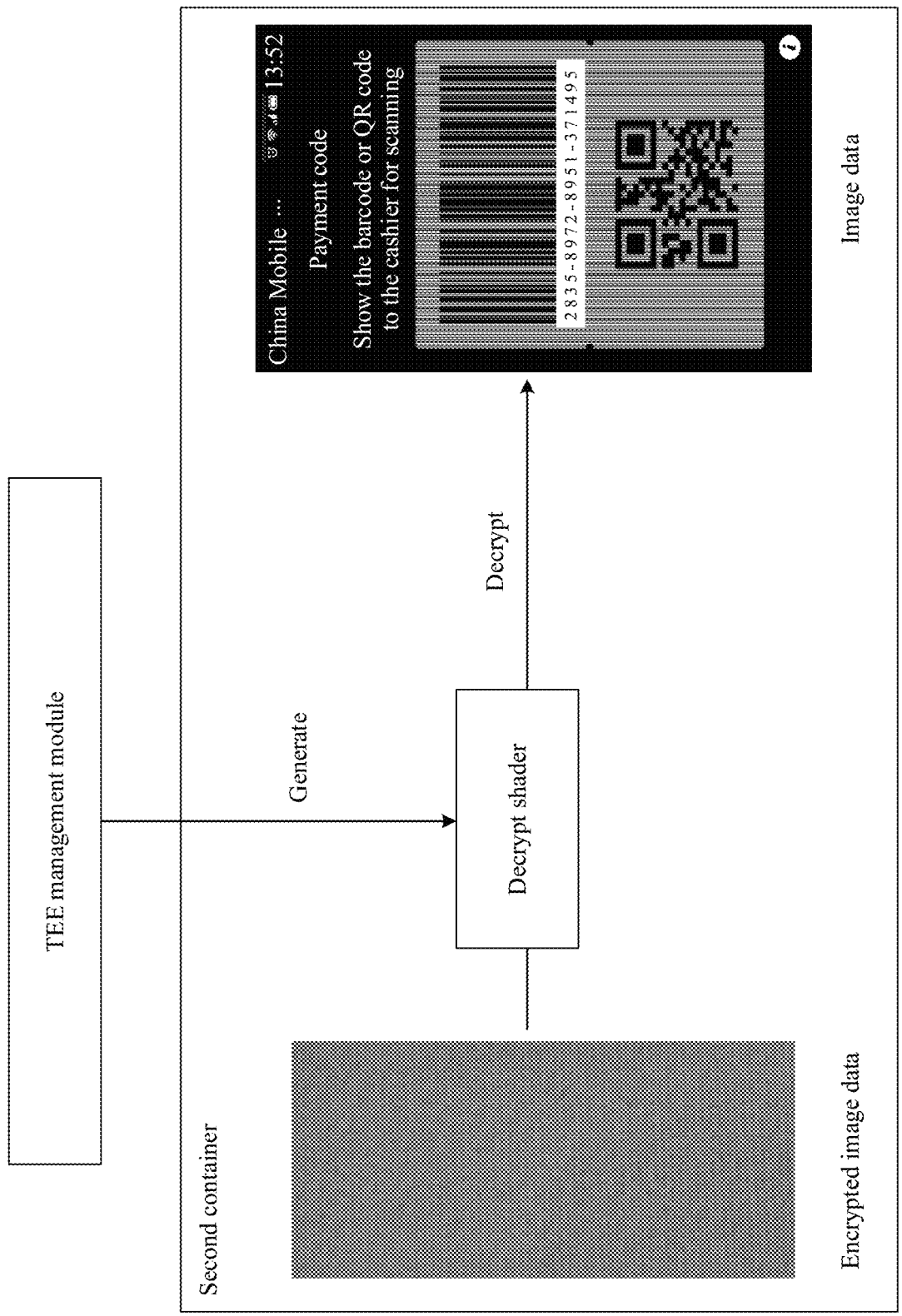
FIG. 6 is a schematic diagram of a decryption procedure according to an embodiment of this application.

The following uses a payment scenario as an example to describe in detail a possible implementation of encryption and decryption with reference to FIG. 4, FIG. 5, and FIG. 6.

Taking a secure display procedure of a two-dimensional code for payment in Alipay as an example, after determining that a two-dimensional code payment page of Alipay needs to be displayed, a first container generates a two-dimensional code payment image through rendering, as shown by a two-dimensional code page in FIG. 4.

With reference to FIG. 1b, before image data corresponding to the two-dimensional code page is sent to a display buffer, the image data is encrypted in a graphics rendering pipeline corresponding to the first container, to generate encrypted image data. FIG. 5 shows an example of a schematic diagram of an encryption procedure according to an embodiment of this application.

As shown in FIG. 5, a TEE management module generates an encrypt shader. When an Alipay application in the first container needs to be securely displayed, a page that needs to be securely displayed is rendered, and is encrypted by using the encrypt shader to obtain encrypted image data. Even if permission of the first container is cracked by malware, the malware can obtain only the encrypted image data at best, but the malware cannot identify real content of the encrypted image data. In other words, the malware obtains only garbled image data, instead of the two-dimensional code page that is shown in FIG. 4 and that is visible to a user. Therefore, it can be ensured that the malware in the first container cannot attack or intercept image data that is visible to the user and that needs to be securely displayed.

For the encrypted image data obtained in FIG. 5, FIG. 6 shows an example of a schematic diagram of a decryption procedure according to an embodiment of this application. As shown in FIG. 6, a second container decrypts the encrypted image data by using a decrypt shader generated by the TEE management module, to obtain a normal two-dimensional code page and display the page to the user, so that the image data is securely displayed in the second container.

In the foregoing embodiment, each application may correspond to one or more encrypt shaders. Because an encrypt shader and a decrypt shader usually appear in pairs, each application may also correspond to one or more decrypt shaders.

In an embodiment, when each application may correspond to one encrypt shader, to reduce a quantity of interactions between the first container and the TEE management module, the first request message may be sent to the TEE management module when the first page that needs to be securely displayed in the application needs to be displayed, and a subsequent page that needs to be securely displayed in the application may be directly encrypted by using the obtained encrypt shader. Correspondingly, the TEE management module needs to generate only one encrypt shader and a decrypt shader corresponding to the encrypt shader for each application. Certainly, to ensure security of the encrypted image data, the encrypt shader and the decrypt shader corresponding to each application may be periodically updated, to prevent the decrypt shader from being intercepted. Therefore, real content of the encrypted image data cannot be intercepted.

For example, if an application that currently needs to be securely displayed is WeChat, the TEE management module generates an encrypt shader A and a decrypt shader A corresponding to WeChat. When the application that needs to be securely displayed is switched to Alipay, the TEE management module generates an encrypt shader B and a decrypt shader B corresponding to Alipay. In other words, all pages that need to be securely displayed in WeChat are encrypted by using the encrypt shader A, and are decrypted in the second container by using the decrypt shader A. All pages that need to be securely displayed in Alipay are encrypted by using the encrypt shader B, and are decrypted in the second container by using the decrypt shader B.

In another embodiment, when each application may correspond to a plurality of encrypt shaders, each page that needs to be securely displayed may correspond to one encrypt shader. For example, Alipay includes a page 1 and a page 2. When the page 1 needs to be securely displayed, the TEE management module generates an encrypt shader B and a decrypt shader B corresponding to the page 1. When the page 2 needs to be securely displayed, the TEE management module generates an encrypt shader C and a decrypt shader C corresponding to the page 2. In other words, when a page of the application in the first container changes, a new encrypt shader and a new decrypt shader are generated. In this way, security of the image data can be further improved.

In an embodiment, keys for encrypting the image data in operation 201 and decrypting the encrypted image data in operation 204 are one key pair.

In the foregoing embodiment, the encrypt shader is obtained based on an encryption algorithm and an encryption key, the decrypt shader is obtained based on a decryption algorithm and a decryption key, and the encryption key and the decryption key are one key pair. To further improve security of the image data, in one embodiment, an encryption key and a decryption key included in each key pair are randomly generated by the TEE management module. Each application may correspond to one key pair, or each page in the application may correspond to one key pair. In this way, the image data encrypted by using the encryption key randomly generated by the TEE management module lacks a matched decryption means in the first container, and cannot be decrypted or restored in the first container. Therefore, security of the encrypted image data can be ensured, and a very small amount of real image data is intercepted.

After the first container receives the first response message returned by the TEE management module, and obtains the encrypt shader, a Linux kernel sets the encrypt shader in the graphics rendering pipeline corresponding to the first container, and writes the image data into the display buffer corresponding to the first container after the image data is encrypted by using the encrypt shader. After obtaining the encrypted image data, the second container obtains the decrypt shader from the TEE management module. The Linux kernel sets the decrypt shader in the graphics rendering pipeline corresponding to the second container, decrypts the encrypted image data by using the decrypt shader, and displays the decrypted image data on the display device.

Embodiment 2

Figure 7A:
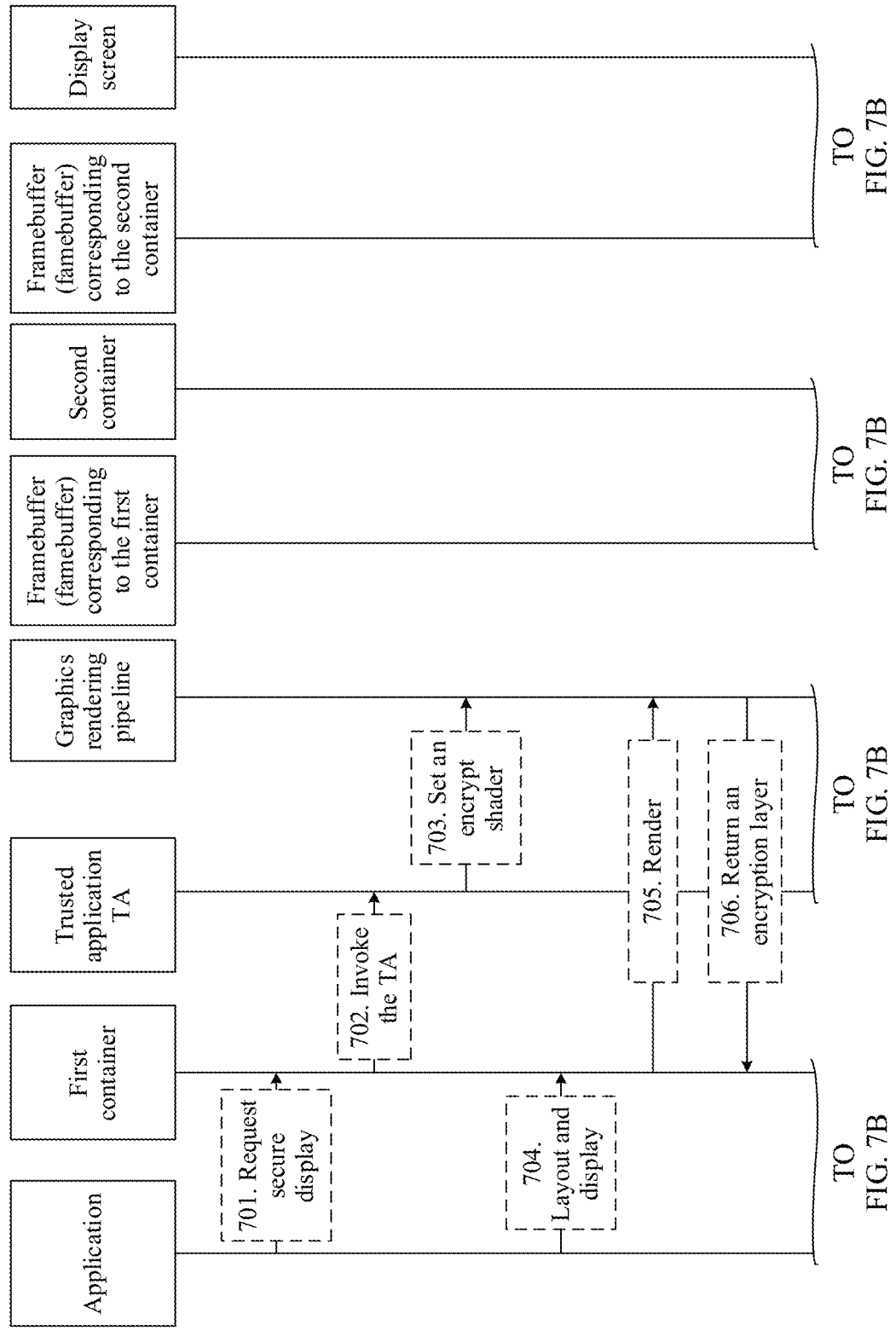
FIG. 7A and FIG. 7B are another schematic flowchart of a display method according to an embodiment of this application.
Figure 7B:
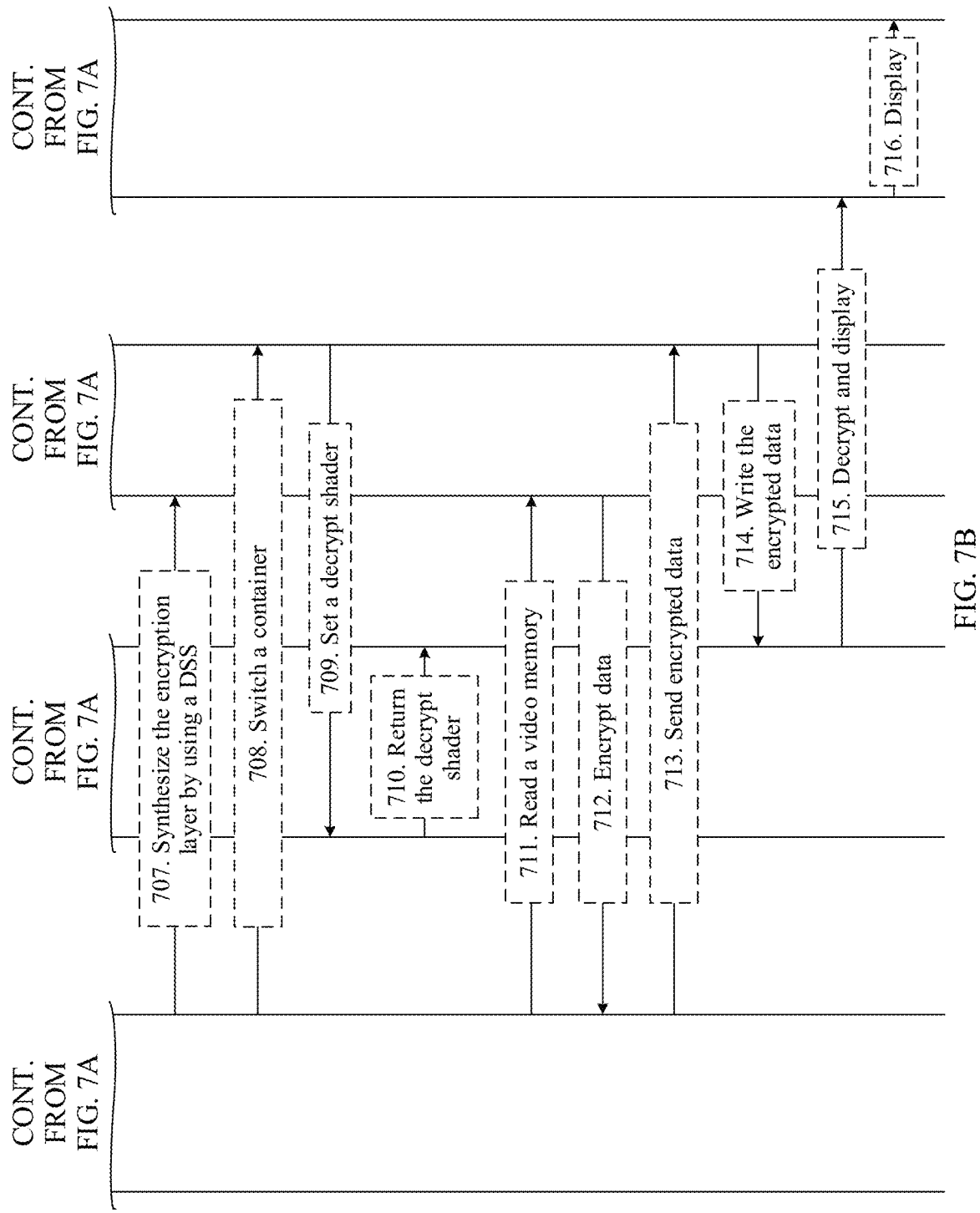

FIG. 7A and FIG. 7B show an example of another schematic flowchart of a display method according to an embodiment of this application. As shown in FIG. 7A and FIG. 7B, the display method includes the following operations.

Operation 701: When a page that needs to be securely displayed in an application runs, the application initiates a secure display request to a first container, to prevent the page from being intercepted or recorded by malware.

Operation 702: The first container receives the secure display request sent by the application, and initiates a request to a TEE by invoking a trusted application TA developed in advance by using a TEE software development kit (SDK), and after executing the TA, the TEE returns an encrypt shader to the TA, where the encrypt shader is used by a graphics processing unit GPU to execute an instruction for encrypting image data.

Operation 703: The TA returns the encrypt shader (encrypt shader), and embeds the encrypt shader in a graphics rendering pipeline executed by the GPU.

Operation 704: The application renders, by invoking a layout and display of a system user interface (UI) component, the page that needs to be securely displayed.

Operation 705: The UI component invokes an open graphics library (OpenGL) graphics program interface to perform GPU rendering to obtain a render layer.

Operation 706: The GPU executes the instruction corresponding to the encrypt shader embedded in the graphics rendering pipeline, and returns, to the first container, an encryption layer obtained after the OpenGL render layer is encrypted.

Operation 707: The encryption layer performs multi-layer synthesis by using a synthesizer. For example, multi-layer synthesis is performed on a graphics synthesis service surfaceflinger in an Android (android) system by using a display subsystem (DSS), and a synthesized layer is directly sent to a framebuffer corresponding to the first container for display.

Operation 708: Enable a second container to take over the display subsystem and an input subsystem by switching container invoking.

Operation 709: The second container sends a request to the TA for a decrypt shader, so that the TA returns the decrypt shader after executing an instruction in the request.

Operation 710: The TA returns the decrypt shader, and embeds the decrypt shader in the graphics rendering pipeline executed by the GPU.

Operation 711: The first container reads encrypted image data.

Operation 712: Read the encrypted image data into the first container. Therefore, even if the encrypted image data is intercepted by the malware, image data of a real page cannot be obtained.

Operation 713: Send the encrypted image data to a display subsystem in the second container through cross-container communication (for example, Socket or Binder).

Operation 714: The second container writes the encrypted image data into the graphics rendering pipeline executed by the GPU.

Operation 715: The GPU decrypts the encrypted image data by using the decrypt shader, and writes decrypted image data into a framebuffer corresponding to the second container.

Operation 716: The second container controls a display peripheral to normally send the image data in the framebuffer corresponding to the second container for display.

According to the display method, the encrypted image data may be decrypted by using the second container, and real content of the image data is displayed, so that image data of a to-be-displayed page can be prevented from being intercepted by the malware. In addition, in comparison with a secure display solution that depends on specific security hardware in the prior art, in this embodiment of this application, a UI page layout is performed on the encrypted image data by using the UI component in the first container. Therefore, display by the second container is not restricted by a UI page layout capability, thereby improving security of displaying the image data while ensuring that an image display function is not restricted.

It can be understood that, to implement corresponding functions, each device in the foregoing embodiments may include a corresponding hardware structure and/or a corresponding software module for executing the functions. A person skilled in the art should easily be aware that, units and operations in the examples described in combination with the embodiments disclosed in this specification may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

Figure 8:
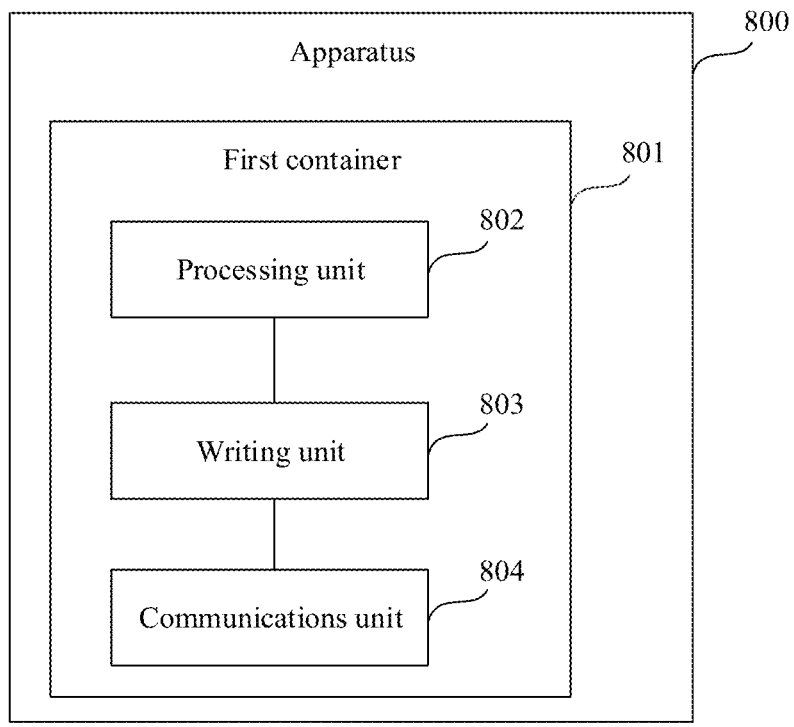
FIG. 8 is a schematic structural diagram of an apparatus according to an embodiment of this application.

FIG. 8 shows an example of a possible block diagram of an apparatus 800 in an embodiment of the present disclosure. The apparatus 800 may exist in a form of software. The apparatus 800 includes a first container 801, and the first container 801 may include a processing unit 802, a writing unit 803, and a communications unit 804. In an implementation, the communications unit 804 may include a receiving unit and a sending unit. The processing unit 802 is configured to control and manage an action of the first container 801. The communications unit 804 is configured to support the first container 801 in communicating with another container or module.

The processing unit 802 may support the first container 801 in performing an action of the first container in the foregoing method examples. The communications unit 804 may support communication between the first container 801 and a second container, or another container, or another module. For example, the communications unit 804 is configured to support the first container 801 in performing operation 202 in FIG. 2 to send instruction information to the second container.

The processing unit 802 may render a to-be-displayed page to generate to-be-displayed image data, and encrypt the image data, where the to-be-displayed page is a page of an application in the first container. The writing unit 803 may write encrypted image data into a buffer corresponding to the first container. The communications unit 804 may send instruction information to the second container, where the instruction information is used to instruct the second container to securely display the encrypted image data.

In one embodiment, before the image data is encrypted, the communications unit 804 may further send a first request message to a TEE management module, and receive a first response message returned by the TEE management module included in the apparatus 800, where the first response message includes an encrypt shader generated by the TEE management module based on the first request message. The processing unit 802 may encrypt the image data using the encrypt shader.

In one embodiment, when determining that an application in the first container needs to be securely displayed, the processing unit 802 may render the to-be-displayed page of the application to generate the to-be-displayed image data, and encrypt the image data.

In one embodiment, when determining that the communications unit 804 receives a secure display request triggered by the application, or when determining that the application is a preset secure application, the processing unit 802 may determine that the application in the first container needs to be securely displayed, where the secure display request may indicate that the application needs to be securely displayed.

Figure 9:
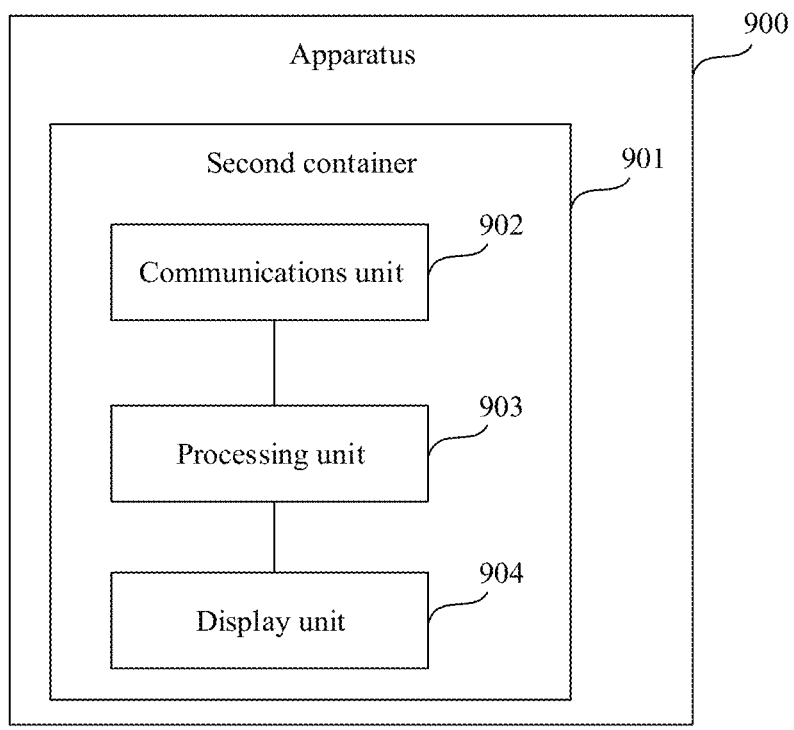
FIG. 9 is another schematic structural diagram of an apparatus according to an embodiment of this application.

FIG. 9 is a possible example block diagram of an apparatus according to an embodiment of the present disclosure. The apparatus 900 may exist in a form of software. The apparatus 900 includes a second container 901. The second container 901 may include a communications unit 902, a processing unit 903, and a display unit 904. In an implementation, the communications unit 902 may include a receiving unit and a sending unit. The processing unit 903 is configured to control and manage an action of the second container 901. The communications unit 902 is configured to support the second container 901 in communicating with another container or module.

The processing unit 903 may support the second container 901 in performing an action of the second container in the foregoing method examples. The communications unit 902 may support communication between the second container 901 and the first container or another container or module. For example, the communications unit 902 is configured to support the second container 901 in performing operation 203 in FIG. 2.

The communications unit 902 may receive instruction information sent by the first container, where the instruction information is used to instruct the processing unit 903 to securely display the encrypted image data generated by the first container. The processing unit 903 may obtain the encrypted image data based on the instruction information, and decrypt the encrypted image data. The display unit is configured to securely display the decrypted image data.

In one embodiment, before decrypting the encrypted image data, the communications unit 902 may further send a second request message to a TEE management module included in the apparatus 900, and receive a second response message returned by the TEE management module, where the second response message includes a decrypt shader generated by the TEE management module based on a first request message sent by the first container. The processing unit 903 may decrypt the encrypted image data by using the decrypt shader.

In one embodiment, the processing unit 903 may obtain the encrypted image data from the instruction information; or read, based on the indication information, the encrypted image data from a buffer corresponding to the first container.

Figure 10:
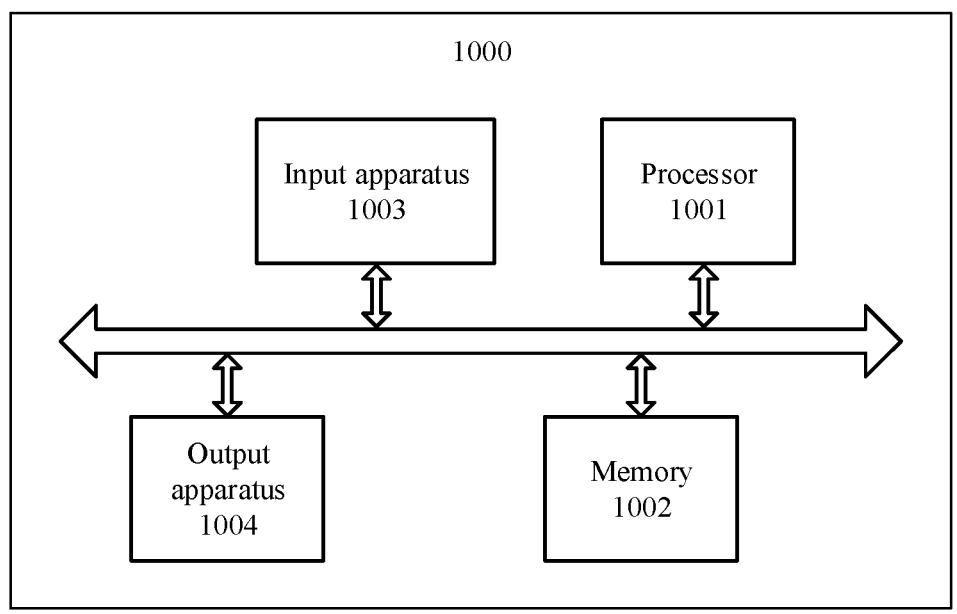
FIG. 10 is another schematic structural diagram of an apparatus according to an embodiment of this application.

Based on a same concept, FIG. 10 is a schematic structural diagram of hardware of an apparatus 1000 according to an embodiment of this application. As shown in FIG. 10, the apparatus 1000 includes one or more processors 1001 and a memory 1002. In FIG. 10, one processor 1001 is used as an example.

The apparatus for performing the display method may further include an input apparatus 1003 and an output apparatus 1004.

The processor 1001, the memory 1002, the input apparatus 1003, and the output apparatus 1004 may be connected by using a bus or in another manner. In FIG. 10, an example in which the processor 1001, the memory 1002, the input apparatus 1003, and the output apparatus 1004 are connected by using a bus is used.

As a non-volatile computer readable storage medium, the memory 1002 may be configured to store a non-volatile software program and a non-volatile computer executable program and module, for example, a program instruction/module corresponding to the display method in the embodiments of this application. The processor 1001 runs the non-volatile software program, the instruction, and the module that are stored in the memory 1002, to execute various function applications and data processing of a server, that is, implement the foregoing method.

The processor 1001 may be a general-purpose central processing unit (CPU), a general-purpose processor, a digital signal processor (DSP), an application-specific integrated circuit (ASIC), a field programmable gate array (FPGA) or another programmable logical device, a transistor logical device, a hardware component, or any combination thereof. The processor 1001 may implement or execute various example logical blocks, modules, and circuits described with reference to content disclosed in the present disclosure. Alternatively, the processor may be a combination of processors implementing a computing function, for example, a combination of one or more microprocessors or a combination of a DSP and a microprocessor. In this embodiment of this application, the processor 1001 may perform the method performed by the processing unit 802, the write unit 803, and the communications unit 804 in FIG. 8, or may perform the method performed by the communications unit 902, the processing unit 903, and the display unit 904 in FIG. 9.

The memory 1002 may include a program storage area and a data storage area. The program storage area may store an operating system and an application program required by at least one function. The data storage area may store data created based on use of a processing apparatus that operates according to a list item, and the like. In addition, the memory 1002 may include a high speed random access memory, and may further include a non-volatile memory such as at least one magnetic disk storage device, a flash memory, or another non-volatile solid-state storage device. In some embodiments, the memory 1002 may optionally include a memory that is remotely disposed relative to the processor 1001. The remote memory may be connected, via a network, to a processing apparatus hat operates according to a list item. An example of the network includes but is not limited to the internet, an enterprise internal network, a local network, a mobile communications network, and a combination thereof. In one embodiment, the memory 1002 may alternatively be integrated with the processor 1001.

The input apparatus 1003 may receive entered digital or character information, and generate key signal input related to a user setting and function control of an electronic device. The output apparatus 1004 may include a display device such as a display screen.

The one or more modules are stored in the memory 1002, and when being executed by the one or more processors 1001, the one or more modules perform the method in any one of the foregoing method embodiments.

The foregoing product may perform the method provided in the embodiments of this application, and has corresponding function modules for performing the method and corresponding beneficial effects. For technical details that are not described in detail in this embodiment, refer to the method provided in the embodiments of this application.

All or some of the foregoing embodiments may be implemented by using software, hardware, or a combination thereof. When a software program is used for implementation, the embodiments may be implemented completely or partially in a form of a computer program product. The computer program product includes one or more instructions. When the computer program instructions are loaded and executed on the computer, the procedure or functions according to the embodiments of this application are all or partially generated. The computer may be a general-purpose computer, a dedicated computer, a computer network, or other programmable apparatuses. The instructions may be stored in a computer storage medium or may be transmitted from a computer storage medium to another computer storage medium. For example, the instructions may be transmitted from a website, computer, server, or data center to another website, computer, server, or data center in a wired (for example, a coaxial cable, a fiber, or a twisted pair) or wireless (for example, infrared, radio, microwave, or the like) manner. The computer storage medium may be any medium accessible by a computer, or a data storage device, such as a server or a data center, integrating one or more media. The medium may be a magnetic medium (for example, a floppy disk, a hard disk, or a magnetic tape (MO)), an optical medium (for example, an optical disc), a semiconductor medium (for example, a ROM, an EPROM, an EEPROM, or a solid-state drive (SSD), or the like.

The embodiments of this application are described with reference to the flowcharts and/or block diagrams of the method, the device (system), and the computer program product according to the embodiments of this application. It should be understood that instructions may be used to implement each process and/or each block in the flowcharts and/or the block diagrams and a combination of a process and/or a block in the flowcharts and/or the block diagrams. These instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and operations are performed on the computer or the another programmable device, thereby generating computer-implemented processing. Therefore, the instructions executed on the computer or the another programmable device provide operations for implementing a specific function in one or more processes in the flowcharts and/or in one or more blocks in the block diagrams.

Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A display method comprising:
    rendering, by a first container of a terminal, a to-be-displayed page to generate to-be-displayed image data, wherein the terminal comprises a trusted execution environment (TEE) management module;
    sending, by the first container, a first request message to the TEE management module, and receiving a first response message returned by the TEE management module, wherein the first response message comprises an encrypt shader generated by the TEE management module based on the first request message;
    encrypting, by the first container, the image data, comprising:
        encrypting, by the first container, the image data by using the encrypt shader; and writing, by the first container, encrypted image data into a buffer corresponding to the first container, and sending instruction information to a second container of the terminal, wherein the instruction information is used to instruct the second container to securely display the encrypted image data.

2. The method according to claim 1, wherein the rendering, by the first container, the to-be-displayed page to generate to-be-displayed image data; encrypting, by the first container, the image data comprises:

when determining that an application in the first container needs to be securely displayed, rendering, by the first container, the to-be-displayed page of the application to generate the to-be-displayed image data;

encrypting, by the first container, the image data.

3. The method according to claim 2, wherein the determining, by the first container, that an application in the first container needs to be securely displayed comprises:

receiving, by the first container, a secure display request triggered by the application, wherein the secure display request is used to indicate that the application needs to be securely displayed; or determining, by the first container, that the application is a preset secure application.

4. A display method comprising:

receiving, by a second container of a terminal, instruction information sent by a first container, wherein the instruction information is used to instruct the second container to securely display encrypted image data generated by the first container, wherein the terminal comprises a trusted execution environment (TEE) management module;

obtaining, by the second container, the encrypted image data based on the instruction information;

sending, by the second container, a second request message to the TEE management module, and receiving a second response message returned by the TEE management module, wherein the second response message comprises a decrypt shader generated by the TEE management module based on a first request message sent by the first container;

decrypting, by the second container, the encrypted image data, comprising:

decrypting, by the second container, the encrypted image data by using the decrypt shader; and securely displaying, by the second container, decrypted image data.

5. The method according to claim 4, wherein the obtaining, by the second container, the encrypted image data based on the instruction information comprises:

obtaining, by the second container, the encrypted image data from the instruction information; or reading, by the second container based on the instruction information, the encrypted image data from a buffer corresponding to the first container.

6. An apparatus, comprising:

at least one processor; and a memory communicatively connected to the at least one processor, wherein the memory stores an instruction, which when executed by the at least one processor, cause the at least one processor to perform operations comprising:

rendering a to-be-displayed page to generate to-be-displayed image data, wherein the apparatus further comprises a trusted execution environment (TEE) management module;

sending a first request message to the TEE management module, and receiving a first response message returned by the TEE management module, wherein the first response message comprises an encrypt shader generated by the TEE management module based on the first request message;

encrypting the image data, comprising:

encrypting the image data by using the encrypt shader; and writing encrypted image data into a buffer corresponding to a first container, and sending instruction information to a second container, wherein the instruction information is used to instruct the second container to securely display the encrypted image data.

7. The apparatus according to claim 6, wherein the rendering the to-be-displayed page to generate to-be-displayed image data; encrypting the image data comprises:

when determining that an application in the first container needs to be securely displayed, rendering, by the first container, the to-be-displayed page of the application to generate the to-be-displayed image data; encrypting the image data.

8. The apparatus according to claim 7, wherein the determining that an application in the first container needs to be securely displayed comprises:

receiving a secure display request triggered by the application, wherein the secure display request is used to indicate that the application needs to be securely displayed; or determining that the application is a preset secure application.

9. An apparatus, comprising:

at least one processor; and a memory communicatively connected to the at least one processor, wherein the memory stores an instruction, which when executed by the at least one processor, cause the at least one processor to perform operations comprising:

receiving instruction information sent by a first container, wherein the instruction information is used to instruct a second container to securely display encrypted image data generated by the first container, wherein the apparatus comprises a trusted execution environment (TEE) management module;

obtaining the encrypted image data based on the instruction information;

sending a second request message to the TEE management module, and receiving a second response message returned by the TEE management module, wherein the second response message comprises a decrypt shader generated by the TEE management module based on a first request message sent by the first container;

decrypting the encrypted image data, comprising:

decrypting the encrypted image data by using the decrypt shader; and securely displaying decrypted image data.

10. The apparatus according to claim 9, wherein the obtaining the encrypted image data based on the instruction information comprises:

obtaining the encrypted image data from the instruction information; or reading based on the instruction information, the encrypted image data from a buffer corresponding to the first container.

* * * * *